May 14, 1968
C. R. HARTLEY
3,382,686
FLUID CONTROL DEVICE FOR AUTOMATIC LAUNDRY MACHINES
Filed Feb. 2, 1967
5 Sheets-Sheet 1
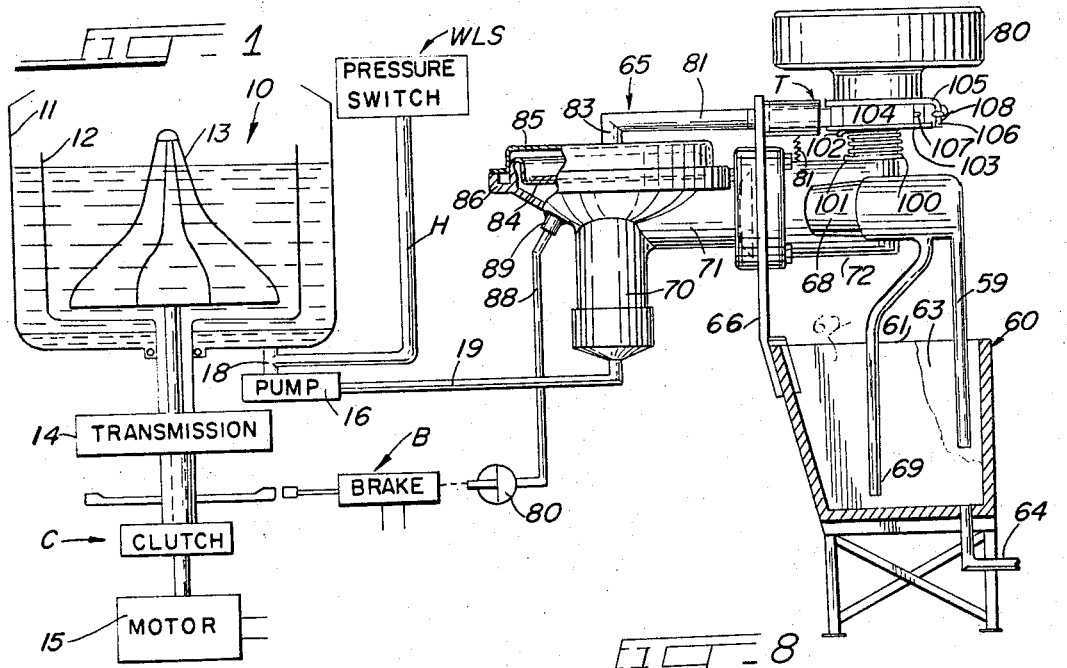
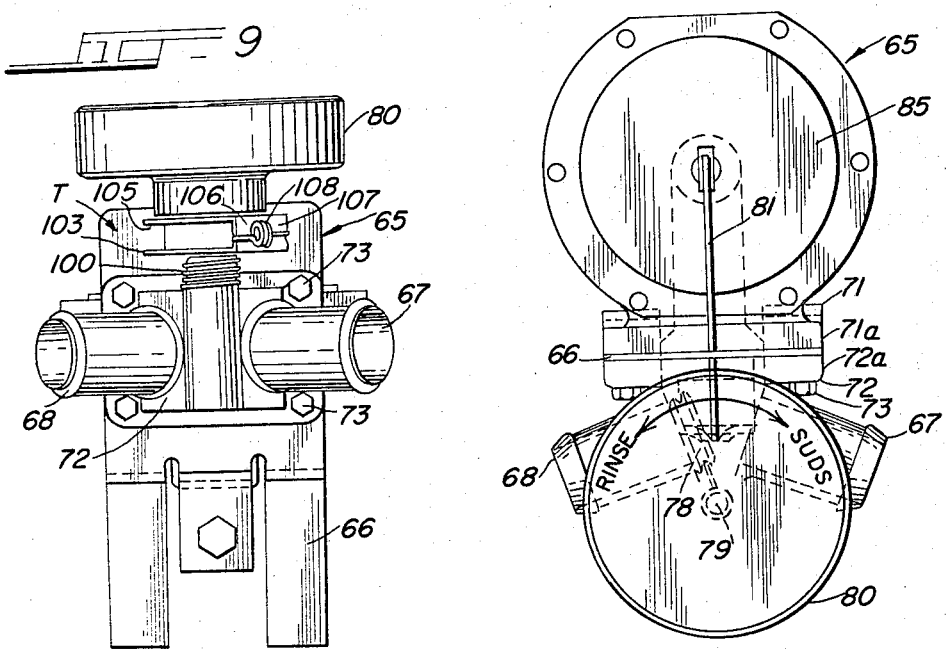
INVENTOR
CURTIS R. HARTLEY
BY May 14, 1968  C. R. HARTLEY  3,382,686
FLUID CONTROL DEVICE FOR AUTOMATIC LAUNDRY MACHINES
Filed Feb. 2, 1967  5 Sheets-Sheet 2
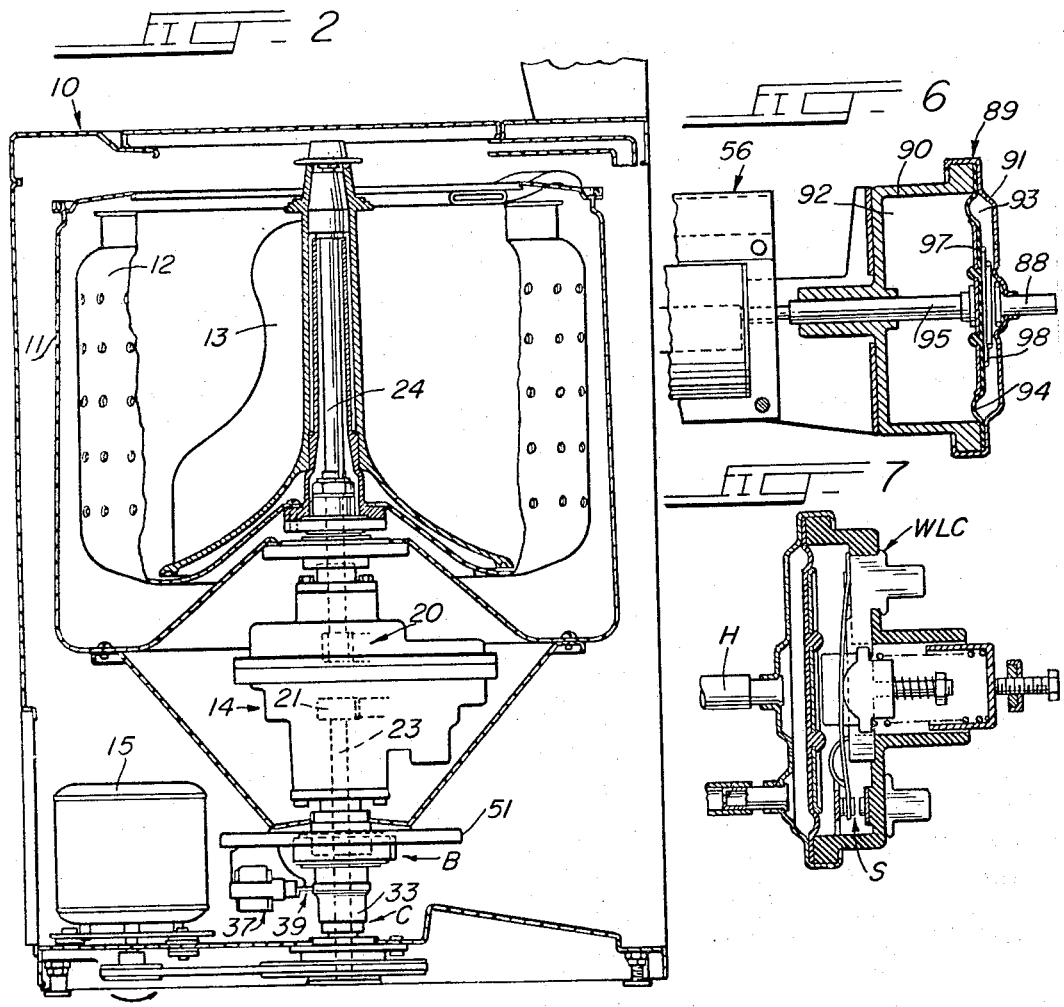
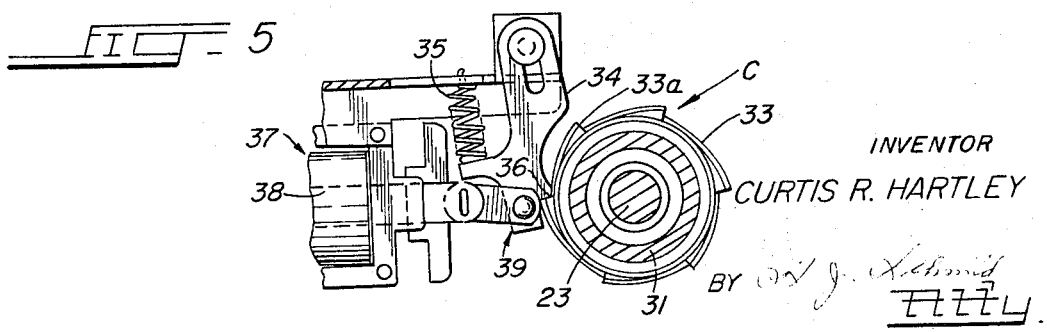
INVENTOR
CURTIS R. HARTLEY

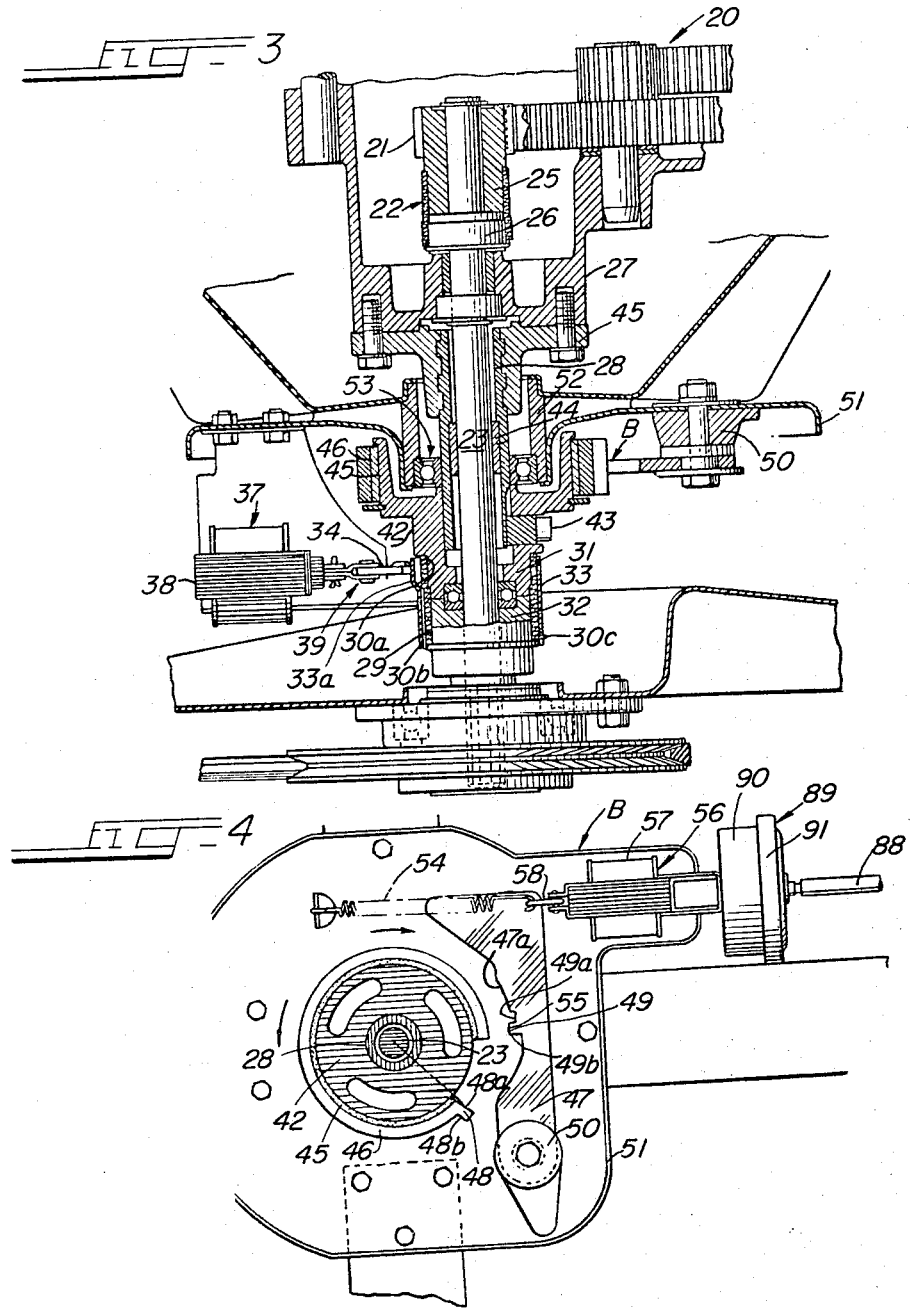

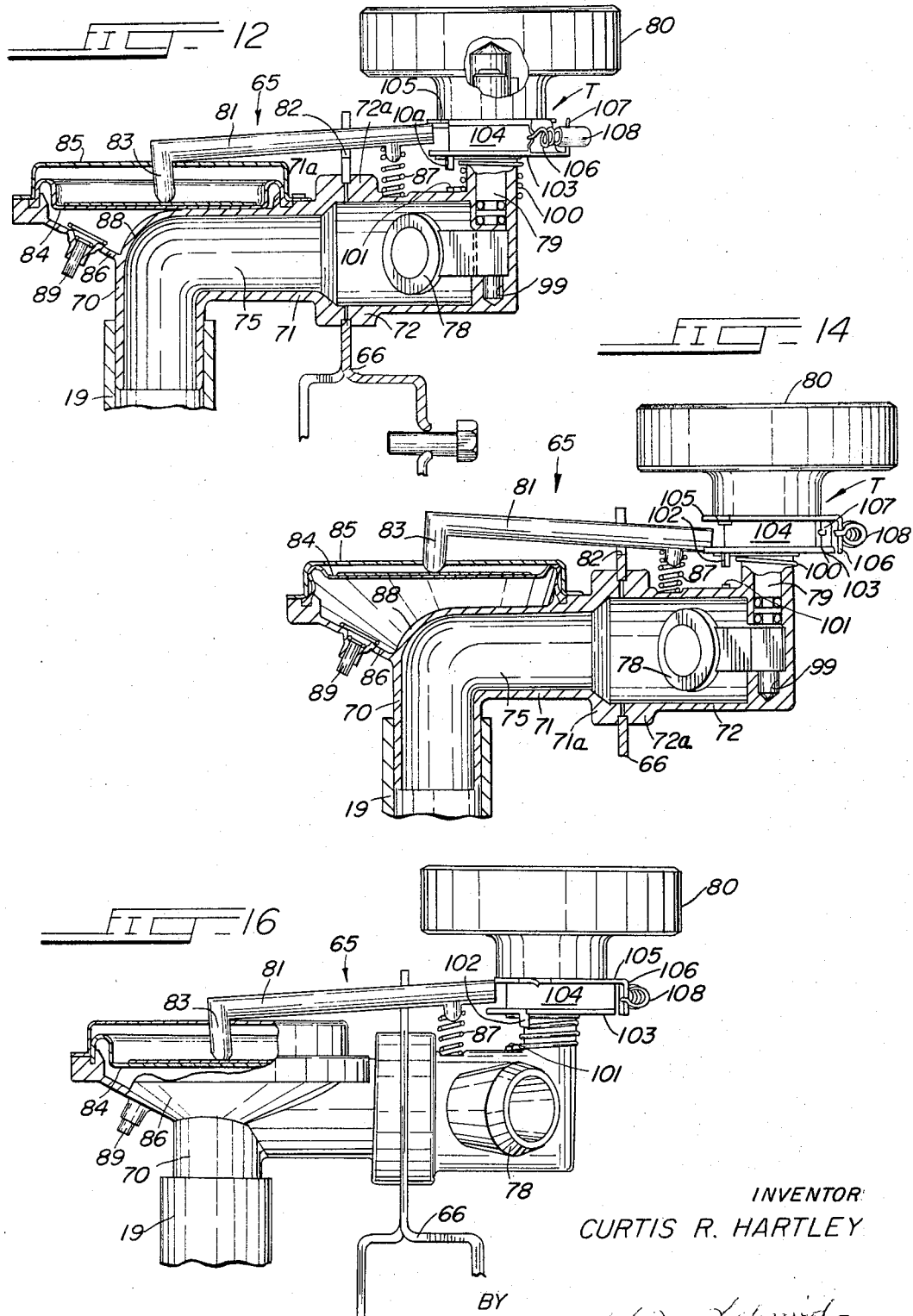

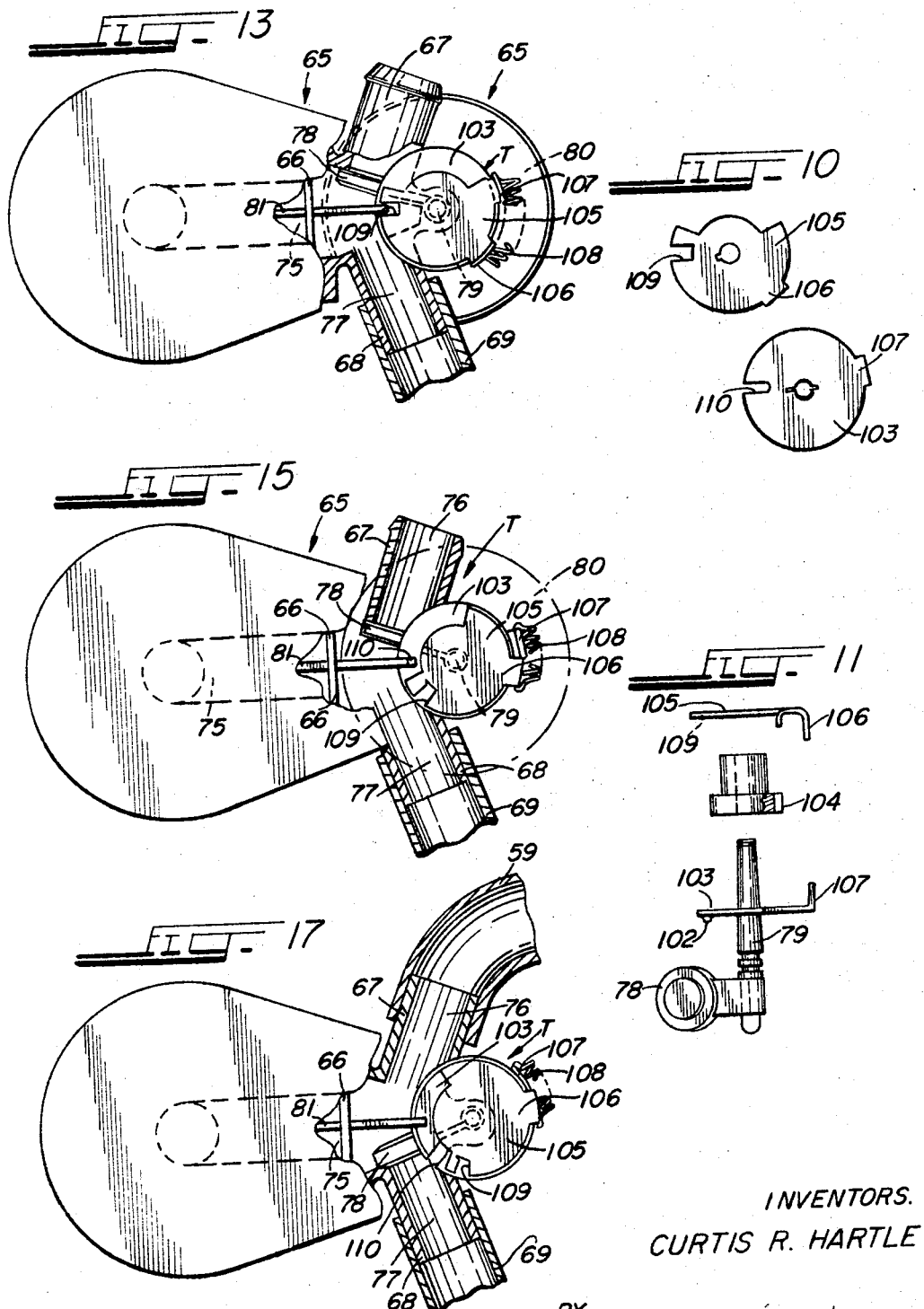

United States Patent Office 3,382,686
Patented May 14, 1968

---

3,382,686
FLUID CONTROL DEVICE FOR AUTOMATIC LAUNDRY MACHINES
Curtis R. Hartley, West Frankfort, Ill., assignor to Borg-Warner Corporation, Chicago, Ill., a corporation of Illinois
Filed Feb. 2, 1967, Ser. No. 613,678
17 Claims. (Cl. 68—23)

ABSTRACT OF THE DISCLOSURE

A suds-water saver control device for automatic washers having a tub enclosing a rotatable clothes container, mechanism for controlling rotation of the container, and a pump operative to transfer suds water to a storage reservoir and rinse water to a drain; the suds-water control device having valve mechanism manually settable to position the valve to direct suds water to the storage reservoir, and actuatable to position the valve to direct rinse water to the drain, and a pneumatic dashpot controlling the valve-actuating mechanism and operable by the basket rotation controlling mechanism to position the valve to direct rinse water to the drain.

---

Summary of the invention

This invention relates to a fluid control device for laundry machines and more particularly to a suds-water saving control device for laundry machines.

Suds-water saving control arrangements are employed in laundry machines to provide for the economical re-usage of the suds-water for several washing operations, the suds-water being evacuated from the laundry machine for storage in a reservoir, after each washing operation, and subsequently transferred from the reservoir to the machine for re-use in a new laundry operation.

Various known suds-water saver controls are expensive and complicated and employ components, such as electrical solenoid-operated valves or pivotal tubes or hoses, or mechanically operated valves or pivotal hoses actuated by floats responsive to the suds-water level in the storage reservoir, these controls being operable to automatically control the flow of suds-water to the reservoir for re-use and thereafter the flow of used rinse water to a drain. In addition, such controls are frequently built into and form integral components of the laundry machines, usually requiring a multiplicity of pumps and valves in the performance of their function.

The present invention contemplates as one of its objectives the provision of a new and improved simplified suds-water saving control device for laundry machines.

Another object of the invention is to provide a new and improved suds-water saving control device for a laundry machine of the type having automatic sequential wash-agitate wash water extract, rinse water agitate, and rinse water extract operations, the control device employing valve-operating mechanism operative to direct wash (suds) water to a storage reservoir and pneumatically controllable during the wash water extract-spin operation to condition the mechanism for automatically operating the valve to subsequently direct rinse water to a drain upon the initiation of the rinse water extract operation.

A further object of the invention is to provide an improved suds-water saving control device for an automatic laundry machine of the type having control means providing for the wash water extract operation of the machine, the control device having valve means to direct suds-water to a storage reservoir and rinse water to a drain and being pneumatically operative by the control means to direct rinse water to a drain, upon completion of transfer of the suds-water to the reservoir.

A further object of the invention is to provide a suds-water control adapted for use as an accessory in conjunction with any automatic laundry machine.

A specific object of the invention is to provide a new and improved suds-water saving system for a laundry machine of the type described and having a two-way diverter valve, control mechanism for the valve and releasably holding the valve to direct suds water from a laundry machine to a reservoir and releasable to effect movement of the valve to direct rinse water to a drain, a pneumatically operated device controlling the mechanism and responsive to operation of the control means of the laundry machine to effect release of the mechanism to move the valve to its drain position, upon completion of suds-water transfer to a storage reservoir.

Further objects and advantages of the invention will become apparent from the following description with reference to the accompanying drawings, the features of novelty characterizing the invention being pointed out particularly in the claims annexed to and forming a part of this specification.

Brief description of the drawings

In the drawings:

FIG. 1 is a side elevational view of the improved suds-water saving control device illustrating its connection with and use in conjunction with a schematically illustrated automatic laundry machine and storage reservoir and drain sinks;

FIG. 2 is a vertical sectional view of the automatic laundry machine;

FIG. 3 is a vertical sectional view of the drive mechanism of the laundry machine and controls therefor;

FIG. 4 is a plan view of a brake assembly of the drive mechanism of FIG. 3 and control therefor and for the suds-water saving control device;

FIG. 5 is a plan view of a clutch assembly of the drive mechanism of FIG. 3;

FIG. 6 is a sectional view of the brake and suds-water saving device controls;

FIG. 7 is a sectional view of a water level pressure switch;

FIG. 8 is a top view of the control device;

FIG. 9 is a front view of the control device;

FIG. 10 illustrates the control discs for the valve operating parts;

FIG. 11 is an exploded view of the valve-operating parts of the control device;

FIGS. 12 and 13 are side and top views of the control device, partly broken away, illustrating the relative position of the valve, and controlling mechanical and pneumatically-operated components of the control device during initiation of flow of suds-water from the laundry machine;

FIGS. 14 and 15 are side and top views of the control device, similar to FIGS. 12 and 13, but illustrating the position of the valve and its control components, during full flow of suds-water from the laundry machine; and FIGS. 16 and 17 are side and top views of the control device, similar to FIGS. 12 and 13, but illustrating the position of the valve and components, at the conclusion of the suds-water saving operation.

Description of the preferred embodiment

Referring to FIG. 1, illustrating schematically, and to FIG. 2, illustrating the mechanical structure of an automatic washing, rinsing and drying machine 10, the machine comprises a tub or fluid container 11, a clothes-containing basket 12, an agitator 13, a drive means or transmission 14 for oscillating the agitator and rotating the basket, a reversible drive motor 15 connected to the transmission and means operative for controlling rotation of the basket including a releasable brake B normally restraining rotation of the basket, and a clutch C operative to connect the basket to the drive motor for rotation thereof. The motor 15 is also connected to a pump 16 operable, during the wash-agitate operation of the machine, to rotate in a counterclockwise direction to pump the suds-water toward the tub connected to the sump or outlet 18 of the tub and to the pump. During the suds-water-extraction period, the motor is reversed and the pump rotates in a clockwise direction to pump the suds-water from the tub, via outlet 18, and through a hose 19. During the subsequent rinse period, fresh water is supplied to the tub and the agitator is oscillated by the transmission, the motor rotating in a counterclockwise direction to pump the rinse water toward the tub. After sufficient time has elapsed to insure thorough rinsing of the clothes, the motor is reversed to rotate the pump, the container, and the transmission in a clockwise direction, the pump operating to evacuate the rinse water from the tub for flow through the hose 19.

Referring to FIGS. 2 and 3, the transmission 14 of the laundry machine comprises a gear set 20 having a drive gear 21 connected by a one-way clutch spring 22 to a shaft 23 driven by the motor 15. The gear set drives a driven shaft 24 coupled to the agitator 13 and is operative to oscillate the agitator during rotation of the motor in one direction. The clutch spring 22 is effective, during rotation of shaft 23 in one direction, to couple hub 25 of gear 21 and hub 26 of shaft 23 to oscillate the agitator, the spring releasing its driving connection during rotation of shaft 23 in an opposite direction.

The transmission housing 27 is directly connected to the basket 12 and to a sleeve shaft 28, the shaft 28 being adapted to be coupled to and driven by the shaft 23 by a one-way coil clutch spring 29 of a clutch C (FIGS. 3 and 5) upon rotation of the shaft 23 by operation of the motor in a direction releasing clutch spring 22. The one-way clutch spring 30 has respective upper and lower portions 30a and 30b extending over respective ends of upper and lower hubs 31 and 32, the hub 32 being fixed to and rotatable with the shaft 23 and the hub 31 being drivably connected to the sleeve shaft 28. Rotation of the lower hub 32 in one direction causes the clutch spring to tighten and wrap around both hubs 31 and 32 to transmit drive from the shaft 23 to the sleeve shaft 28. Rotation of the lower hub 32 in the opposite direction uncoils or loosens the spring so that drive is not transmitted to the upper hub 31.

Selective driving in the wrap-around or drive direction is effected by use of a clutch shield or sleeve 33 extending about the spring 30 and holding an end 30c of the lower spring portion 30b. The sleeve 33 and spring 30 are selectively retarded against rotation, as shown in FIG. 5 by providing on the upper end of the shield a plurality of projecting ears 33a engageable by a clutch pawl 34. The pawl is normally biased by a spring 35 so that a projecting finger 36 can engage one of the ears 33a. The results is that, even though the spring 30 fits snugly about the lower drive shaft hub 31, it can be held stationary during rotation in a direction which would otherwise tighten the spring and effect drive from hub 31 to hub 32, thereby permitting selective drive of the basket.

To engage the clutch spring 30, the shield 33 is released and the spring is permitted to wrap around the respective drive and driven hubs 31 and 32, assuming the drive hub rotates in the proper direction to tighten the spring. The pawl 34 is disengaged by energizing electromagnetic means in the form of a solenoid 37 which has an armature 38 connected by linkage assembly 39 to the clutch pawl and pivots the latter against the force of biasing spring 35.

Selectively operable braking means B (FIG. 4) are provided and which engages and effectively holds the basket during the wash-agitate operation and is releasable during the wash water and rinse water extraction periods of operation of the laundry machine. As illustrated in FIGS. 3 and 4, the braking assembly B includes a brake hub 42 suitably fastened by a clamp 43, to basket drive shaft 28 rotatably held with respect thereto by a bearing 44. A hub 45 is cast on the upper end of the shaft 28 and is fastened to the lower end of the transmission housing 27. Accordingly, the shaft 28 and the transmission housing 27 operate as a unit. The shaft 28 can be held stationary to hold the transmission housing and basket against rotation, while, on the other hand, the shaft 28 can be permitted to move or rotate thereby permitting the basket to move or rotate.

The brake assembly 41 includes the brake hub 42 and friction applying means, here shown as a brake lining 45, preferably disposed for rubbing engagement with the hub and carried by a brake band 46. The brake band is constructed of spring steel to tightly hold the brake lining against the hub. Braking is effected, in either direction of brake band rotation, by selectively holding the brake band against rotation by engaging a brake latch 47. For this purpose, the brake band has a catch, here shown as an integral tang 48, engaging part of the latch catch structure, here shown as a projecting finger 49. The latch 47 is pivotally mounted on a brake latch pedestal 50 depending from a brake support bracket 51. The bracket is mounted on a suspension tube 52 which is supported in a bearing 53 carried in the brake hub 42.

The brake latch 47 is normally biased so that the finger 49 engages the brake band tang 48. To this end, a biasing spring 54 is carried by the brake bracket 51 so as to pivot latch 47 about pedestal 50. As illustrated in FIG. 4, the latch and brake band are disengaged.

The brake structure is effective to hold the basket against movement during the wash-agitation period, movement tending to occur because the oscillating agitator is coupled to the basket via the liquid contained in the tub. The brake band tang 48 is received in a recess 49a in the latch catch structure. Initial engagement occurs between a tang agitate-control face 48b and a latch finger agitate-control face 55. The latch 47 is formed with a radius 47a to permit the brake band tang 48 to ride into engagement with the recess 49a. The provision of the recess 49a assures the holding of the brake band to retard the basket against rotation in either direction. Thus, as movement in both directions is imparted to the basket by the agitator acting through the fluid coupling in the tub, the brake permits slight movement to cushion the change of direction while assuring that the basket does not rotate freely.

To engage the brake in the reverse direction of rotation of the brake band, necessary during the water extraction operations, a control face 48a of tang 48 is engaged with control face 49b of finger 49. Drive is disconnected and the basket permitted to coast to a slow speed or even to a stop before the latch is released into spring biased engagement with tang 48. When the basket rotates in the opposite direction during agitate operation of the washer, the tang 48 swings through latch radius 47a, until the tang is caught by recess 49a.

Free rotation of the basket, the brake hub and transmission housing, is permitted by disengaging the latch from the brake band. For this purpose, electromagnetic means in the form of a solenoid 56 has an armature 57 linked by hook 58 to the brake latch to act against the spring biasing force. Thus, when it is desired to spin the basket, the brake hub is freed for rotation by energizing the brake solenoid 56 and releasing the brake B.

When the brake latch is disengaged from the brake band, the motor rotates in a direction to provide drive to the basket through clutch spring 29 and simultaneously rotates the pump 16 to evacuate the water from the tub 11 for flow through the hose 19.

Programming of the wash water fill operation, wash-agitate operation, basket spin-wash water extraction operation, rinse water fill and agitate operation, and basket spin-rinse water extraction operation, is controlled by a timer having a plurality of cams operative to open and close switches in timed sequence to control circuits to effect specific operations of electrically controlled and controlling components of the laundry machine, such as the brake solenoid 56 and clutch solenoid 37. For example, the control circuits include a water level control WLC having switch S shown in FIGS. 1 and 7 and operable by air pressure, induced by rising water levels in tub 11, in a tube H to cause closing of the switch to establish a circuit to the motor for oscillating the agitator, upon the tub filling with water to a predetermined level.

The automatic washing machine 10 and its electrical control system is disclosed in U.S. Patent 3,267,703, entitled "Automatic Washer" and issued Aug. 23, 1966, and reference may be had to this patent for a more detailed description of the washing machine.

It is desirable to save the suds-water, after the first batch of clothes has been washed, for additional clothes-washing operations of the machine, while providing for the flow of rinse water to a drain. For this purpose, and referring to FIG. 1, a stationary tub 60 is divided by a partition 61 to provide sinks 62 and 63 connected to a common drain tube 64, the sink 62 being plugged to prevent discharge of water to the tube 64 and thus provide a suds-water storage reservoir, while the sink 63 is in fluid communication with the drain tube 64 for flow of rinse water to a sewer.

The suds water saver control device, to which the present invention relates, is indicated generally in the drawing by the reference numeral 65. The control device is designed to be employed as an accessory for conventional non-sudsaver automatic washing machines and, for this purpose, is mounted on the tub 60 by a bracket clamp indicated at 66 in a manner to dispose two spouts 67 and 68 of the device in positions wherein the spout 67 is located to discharge, via hose 59 into the drain sink 63 and the spout 68 into a hose 69 extending downwardly into the suds-water storage sink 62. The control device is also provided with a tubular portion forming a spout 70 disposed exteriorly of the tub 60 and extending downwardly for connection to the hose 19. The body of the control device is formed in two hollow sections 71 and 72 (FIGS. 1 and 8) with screws 73 securing together laterally extending end flanges 71a and 72a of the sections 71 and 72, the outer edges of the mating flanges defining a recess receiving the mounting bracket 66 to support the device on the tub 60, as shown in FIG. 1.

As seen in FIGS. 12 and 13, the hollow sections 71 and 72 provide a fluid passage 75 having two branches 76 and 77 provided by spouts 67 and 68, flow of fluid between passage 75 and the branch 76 or 77 being controlled by a two-way flapper valve 78 pivoted for rotation on a shaft 79 and movable to direct fluid either through the spout 67 into drain sink 63 or through the spout 68 into the storage sink 62. As seen in FIGS. 13 and 15, the valve 78 is shown in position to close the branch 76 to preclude suds-water flowing through spout 67 into the drain sink while permitting the suds-water to flow through branch passage 77 (spout 68) into the storage reservoir 62.

The suds-water saver device is provided with a control arrangement for operation of the two-way valve so that the valve can be operated to discharge suds-water into the sink 62, to discharge rinse water into the sink 63, and to return the suds water to the washing machine. For this purpose, a manually operated knob 80 is operative to rotate the valve to close the branch passage 76 so suds water will flow through branch passage 77 into the storage sink 62. The valve 78 is releasably held in this suds-water saving position by mechanical means in the form of a trigger mechanism T. The trigger mechanism is also controlled by pneumatically operated apparatus responsive to operation of brake B to its released position to permit rotation of the basket when the clutch solenoid 37 is energized to engage clutch C. The control apparatus is effective to condition the trigger mechanism to automatically release the valve for movement to its drain position upon completion of transfer of the suds water by the pump from the washing machine tub to the storage sink.

More particularly, the trigger mechanism T comprises a first control member or a latch in the form of a lever 81 extending through a slot 82 (FIG. 12) in an upwardly extending portion of the bracket 66 and pivotally supported on the upper end of the slot-defining edge thereof, the lever having one end provided with a laterally offset foot 83 extending downwardly and engaging a flexible diaphragm 84 of an air pressure operated device of the pneumatically operated apparatus. The lever foot extends through a slot in a cover 85 enclosing the diaphragm, the cover having a peripheral flange secured to an annular seat of an air pressure chamber portion 86 of the body section 71 of the control device. The lever foot 83 is maintained in engagement with the diaphragm 84 by the pressure of a coil spring 87 seated on and confined between the body section 72 and lever 81. The diaphragm closes the upper portion of a chamber 86, a wall 88 of the body section 71 separating the chamber and passage.

The diaphragm 84 is moved upwardly to rotate the lever in a clockwise direction (FIG. 14) by introducing air under pressure into the chamber through a tube 88 having one end in an opening in the chamber portion 86 and its other end to pressure-creating means, exemplified by an air pressure device or dashpot 89. Referring to FIGS. 4 and 6, the dashpot 89 comprises a housing 90 and a cover 91, defining a pair of enclosures 92 and 93 separated by a movable diaphragm 94 constructed of suitable flexible material such as rubber. To effect operation of the dashpot, a shaft 95 is slidably received in an end wall of the housing 90 and couples the brake solenoid armature to the diaphragm 94. The diaphragm has a centrally positioned plate 97 of rigid material which the end of the shaft acts upon. The diaphragm 94 is biased in a normal position by the spring 98 in the chamber 93.

Upon actuation of the brake solenoid armature to release brake B for rotation of basket 12, the shaft 95 acts against the diaphragm plate 97 and the biasing force of spring 98 to move the diaphragm and force air through tube 88 coupling the dashpot 89 to the chamber 86 of the suds-water saver control device 65. The increased air pressure in chamber 86 causes the diaphragm 84 to move upwardly to rotate the lever 81.

The trigger mechanism further comprises means, cooperating with the lever and diaphragm, for automatically controlling rotation of the valve from its suds-water saving position to its rinse water position upon the conclusion of transfer of the suds-water from the laundry machine tub to the storage sink. In explanation, the valve is fixed to and rotatable with the shaft 79 mounted in a cylindrical bore 99 of the body section 72, the bore communicating with an opening through which the valve extends into the fluid passage 75. Suitable O-ring seals are positioned on the shaft to prevent fluid flow upwardly of the shaft. The valve is normally held in its rinse water position (FIG. 17), in which branch 77 of the passage 75 is closed, by a spring 100 coiled about an upper cylindrical portion of the body 72 partly defining the bore 99, with one end of the spring engaging a pin 101 fixed to the body 72 and the other end of the spring engaging a tab 102 of a second control member or disc 103 keyed to the shaft 79. The constant pressure of the spring, exerted on the shaft, acting to position the valve in sealing relation to the branch 77.

In the event suds-water is to be saved for a new washing operation, prior to initiating the laundering cycle of the machine, the knob 80 is rotated clockwise (FIG. 8) from the "RINSE" position to its "SUDS" position (FIGS. 12, 13) thereby rotating the valve 78 to close the branch passage 76 (spout 67) and open the branch passage 77 (spout 68). The knob is connected to a cylindrical bushing 104 supported on the shaft 79 and rotatable relative to the shaft and the disc 103. The bushing extends through an opening in a third control member or disc 105 and is keyed to the disc so that the knob 80, bushing 104 and disc 105 are coupled for conjoint rotation. The disc 105 has a downwardly projecting tab 106 located in spaced relation to an adjacent upwardly extending tab 107 on disc 103, a coil spring 108 extending between and having its opposite ends respectively engaging the tabs 106 and 107 and urging the tabs toward each other. When the knob is manually rotated to the "SUDS" position, the knob is effective to rotate the disc 105 until its notch 109 is positioned in alignment with the end of the lever, the spring 87 pivoting the lever to position the lever end in the notch. During rotation of the knob and disc 105, spring 108 is effective to rotate disc 103 and thereby shaft 79 in a clockwise direction to move the valve from its rinse water position to its suds-water-saving position shown in FIGS. 12 and 13. It will be noted that the tabs 106 and 107 have moved apart radially thereby extending spring 108 to apply pressure on the valve to close the branch passage 76 in spout 67 for flow of the suds-water through branch passage 77 in spout 68 and hose 69 to the storage sink. Also, spring 100 is wound, by movement of disc 103, to store energy for later operation of the valve to its rinse water position.

The components of the suds-water control device 65 remain in their described FIGS. 12 and 13 positions during the wash-agitate operation. During initiation of the following wash water extract-basket spin operation, the motor is reversed to cause pump 16 to pump wash water from the washer tub 11, through hose 19, and passage 75 and branch 77 of the device, hose 69 into the suds storage reservoir or sink 62. Prior to operation of motor 15, solenoid 37 of clutch C and solenoid 56 of brake B have been energized so that clutch C is engaged and brake B is released. Upon operation of brake solenoid 56, shaft 95 of dashpot 89 (FIGS. 1 and 6) acts against diaphragm plate 97 and the biasing force of spring 98 to move the diaphragm and force air through tube 88 into the air chamber of the suds-saver device causing diaphragm 84 to move to rotate lever 81 in a clockwise direction (FIG. 12), against the action of spring 87 to the position shown in FIG. 14.

It will be apparent the valve-operating trigger mechanism is manually controllable to releasably hold the valve in its suds-saving position; and pneumatically-operated means, in the form of air-pressure responsive diaphragms 89 and 84, control the release of the trigger mechanism and operation thereby of the valve to its rinse water position.

Rotation of lever 81 causes the right end of the lever to be removed from the notch 109 of disc 105 and into a notch 110 in disc 103 fixed to and movable with the valve-operating shaft 79. As a consequence, the valve is retained in its suds-saving position.

At the termination of the wash water-extract-basket spin period, the pump has evacuated the wash water from the washer tub to the suds storage reservoir. At this time, the basket and clutch solenoids 56 and 37 are de-energized and the tub is filled with rinse water and motor 15 energized to oscillate the agitator. Upon de-energization of solenoid 56, spring 98 moves the diaphragm 94 to the left (FIG. 6) releasing air from the chamber 84 and spring 87 moves lever counterclockwise from its FIG. 14 position to its FIG. 16 position. As a result, the lever is disengaged from disc 103 so that spring 100 uncoils to rotate shaft 79, discs 103 and 105, knob 80 and valve 78 as an assembly. This movement causes valve 78 to open the branch passage 76 in spout 67 and close branch passage 77 in spout 68 so that, during the subsequent rinse water-extract operation of the washer, rinse water is pumped through passage 75, branch passage 76 of spout 67, hose 59, into the drain sink 63. At this time, the components of the device are in the positions shown in FIGS. 16 and 17.

It will be apparent that, when the suds-water is to be removed from the storage sink to the washer tub for a new laundry operation, the knob is rotated to the "SUDS" position shown in FIG. 12 to move, and releasably hold, the valve to close passage 76 so that the pump will provide a sucking action effective to withdraw the suds-water from the reservoir sink for flow through open passages 36 and 35, hose 19, pump 16, hose 17 to the washer tub 11.

Should an election be made not to save suds-water prior to initiating the laundry operation, manual actuation of the knob is unnecessary as the suds water will be directed through the sudsaver device to the drain sink.

I claim:
1. In a laundry machine having a fluid container provided with an outlet; a rotatable basket in said container; drive means for said basket; means operative for controlling rotation of said basket and including means operable to connect said drive means and said basket; a valve connected to said outlet and adapted for communication with a storage reservoir and a drain and having a first position for directing fluid to said storage reservoir and a second position for directing fluid to said drain, and a pump operable to pump fluid from said outlet to said valve during the connection of said drive means and basket, the improvement residing in control means for said valve and including mechanical means for releasably holding said valve in its first position and operable to release said valve and to move said valve to its second position; and pneumatically actuated means, responsive to operation of said basket-rotation controlling means, for controlling said mechanical means.

2. In a laundry machine as defined in claim 1 wherein the controlling means includes a brake device normally restraining rotation of the basket and operable to release the basket for rotation, and a clutch device operable to connect the drive means and basket; and the pneumatically actuated means is responsive to operation of one of the devices.

3. In a laundry machine as defined in claim 1 wherein the pneumatically actuated means is connected to the mechanical means and, upon operation of the basket-rotation controlling means, is actuatable thereby to condition the mechanical means to release and move the valve to its second position thereafter when the controlling means is inoperative.

4. In a laundry machine as defined in claim 1 wherein the controlling means includes a brake device normally restraining rotation of the basket and operable to release the basket for rotation, and a clutch device is operable to connect the drive means and basket; and the pneumatically actuated means is responsive to operation of the brake device.

5. In a laundry machine as defined in claim 1 wherein the controlling means includes a brake device normally restraining rotation of the basket and operable to release the basket for rotation, and a clutch device is operable to connect the drive means and basket; and the pneumatically actuated means is connected to the mechanical means, and upon operation of one of the devices, is actuatable thereby to condition the mechanical means to release and move the valve to its second position thereafter when the clutch device disconnects the drive means and basket and the brake device is effective to restrain basket rotation.

6. In a laundry machine as defined in claim 1 wherein the mechanical means includes a trigger mechanism releasably holding the valve in its first position, and biasing means for releasing the trigger mechanism; and the pneumatically operated means controls release of the trigger mechanism by the biasing means.

7. In a laundry machine as defined in claim 1 wherein the mechanical means includes a trigger mechanism releasably holding the valve in its first position, and biasing means for releasing the trigger mechanism; and the pneumatically operated means controls release of the trigger mechanism by the biasing means; and the mechanical means also includes means for biasing the valve to its second position upon release of the trigger mechanism.

8. In a laundry machine as defined in claim 1 wherein the mechanical means includes a trigger mechanism releasably holding the valve in its first position; the controlling means includes a brake for the basket; and the pneumatically-actuated means includes a first air-pressure operated device operable by the brake, and a second air-pressure operated device responsive to operation of the first air-pressure operated device and connected to the trigger mechanism for controlling release of the trigger mechanism.

9. In a laundry machine as defined in claim 1 wherein the mechanical means includes trigger mechanism releasably holding the valve in its first position and having a lever for tripping the mechanism, and means for biasing said lever to trip the mechanism; and the pneumatically operated means is operatively connected to the lever to prevent operation of the lever by the force of said biasing means.

10. In a laundry machine as defined in claim 1 wherein the mechanical means includes a trigger mechanism releasably holding the valve in its first position, and a lever engaging the trigger mechanism and movable to trip the trigger mechanism; a first spring is provided for moving the lever to its tripping position; and a second spring is provided for rotating the valve to its second position; the means for controlling basket rotation includes a brake for the basket; and the pneumatically operated means includes a first air-pressure operated device connected to the brake, and a second air-pressure operated device in communication with the first device and connected to the lever, release of the brake operating the first device to provide air under pressure to the second device to engage the lever with the trigger mechanism, and subsequent engagement of the brake operating the first device to release air under pressure to the second device to effect operation of said lever by the first spring to trip the mechanism and operation of the second spring to rotate the valve to its second position.

11. In cleansing apparatus having a fluid container provided with an outlet; a rotatable basket in said container; drive means for said basket; means controlling rotation of said basket by said drive means and including a clutch operable to connect said basket and drive means, a brake normally preventing rotation of said basket, and means for operating said clutch and releasing said brake; a conduit connected to said outlet and having first and second branches respectively connected to a fluid storage reservoir and to a drain; a two-way valve having a first position to direct fluid through said first branch to said storage reservoir and a second position to direct fluid through said second branch to said drain; pump means operative to pump fluid from said container to said valve during rotation of said basket, the combination therewith of control means for said valve including a first spring for biasing said valve to its second position; trigger mechanism operative to hold said valve in its first position against the biasing action of said first spring and trippable for releasing said valve for movement to its second position by said first spring, said trigger mechanism including a first control member connected to said valve and engaged by said first spring and operative thereby to move said valve to its second position, a second control member engaging and releasably holding said first control member in the first valve position against the biasing action of said first spring; a second spring biasing said second control member to release its engagement with said first control member; pneumatically operated means including an air pressure operated device controlled by said brake and having a diaphragm connected to said second control member and operable by air under pressure transmitted thereto by releasing movement of said brake to maintain said second control member in engagement with said first control member against the biasing action of said second spring, said second spring being operative to release said second control member from said first control member for operation of said first spring, upon release of air pressure on said diaphragm by engaging movement of said brake.

12. In cleansing apparatus as defined in claim 10 wherein the valve is rotatable between its first and second positions; the first control member is a disc rotatable with the valve and having a notch; and the second control member is a trip lever having one end received in the notch of the disc and its other end engaged by the diaphragm.

13. In cleansing apparatus as defined in claim 10 wherein the trigger mechanism includes a third control member manually operative to engage and hold the second control member in the first valve position and releasable from said second control member, during operation of the diaphragm by air under pressure, for movement of the second control member by the diaphragm into engagement with the first control member.

14. In a cleansing apparatus as defined in claim 13 wherein a third spring is connected to the first control member and to the third control member and biases the third control member for movement of the third control member relative to the first control member upon release of the third control member by the second control member.

15. In a cleansing apparatus as defined in claim 13 wherein the third control member is a disc manually rotatable relative to the valve and first control member and has a notch, and the second control member is a trip lever having one end received in the notch of the disc and its other end engaged by the diaphragm, and a third spring connects the disc and first control member and biases the disc for rotation relative to the first control member upon release of the disc by the lever.

16. In a cleansing apparatus as defined in claim 13 wherein the third control member is engaged with the second control member by the second spring, and is released upon movement of the second control member by the diaphragm in response to air under pressure acting on the diaphragm.

17. In a cleansing apparatus as defined in claim 11 wherein the pneumatically operated means includes, in addition to the first-named air pressure device, a second air pressure operated device having a diaphragm, connected to the brake for operation thereby during releasing movement of the brake, for transmitting air under pressure to the diaphragm of the first-named air pressure operated device to maintain the second control member in engagement with the first control member, engaging movement of the brake operating the diaphragm of the second air pressure operated device to release air under pressure on the diaphragm of the first-named air pressure operated device to effect operation of the second spring.

References Cited

UNITED STATES PATENTS

| | | | |
|---|---|---|---|
| 2,391,561 | 12/1945 | Geldhof et al. | 68—12 |
| 2,894,384 | 7/1959 | Smith | 68—12 |
| 2,920,469 | 1/1960 | Henshaw | 68—12 |
| 2,931,200 | 4/1960 | Schell et al. | 68—12 |

WILLIAM I. PRICE, *Primary Examiner.*